United States Patent [19]
Sigel et al.

[11] Patent Number: 6,156,223
[45] Date of Patent: Dec. 5, 2000

[54] XEROGELS AND THEIR PREPARATION

[75] Inventors: Gary A. Sigel; Roman C. Domszy, both of Lancaster, Pa.

[73] Assignee: Armstrong World Industries, Inc., Lancaster, Pa.

[21] Appl. No.: 08/051,886

[22] Filed: Apr. 26, 1993

[51] Int. Cl.[7] .............................. E04B 1/74; B01J 13/00; B05D 7/00

[52] U.S. Cl. .......................... 252/62; 423/338; 427/219; 428/405; 501/12; 516/101

[58] Field of Search ........................... 252/315.01, 315.2, 252/315.6, 315.7, 62; 501/12; 423/338; 428/405; 516/101; 427/219

[56] References Cited

U.S. PATENT DOCUMENTS

| | | | |
|---|---|---|---|
| 2,978,298 | 4/1961 | Wetzel et al. | 423/338 |
| 3,055,831 | 9/1962 | Barnett et al. | 252/62 |
| 3,941,719 | 3/1976 | Yoldas | 502/355 |
| 3,944,658 | 3/1976 | Yoldas | 423/626 |
| 3,948,806 | 4/1976 | Witt | 423/338 X |
| 3,953,487 | 4/1976 | Kratel et al. | 556/453 |
| 3,977,993 | 8/1976 | Lynch | 423/338 |
| 4,102,703 | 7/1978 | Tully | 252/315.2 X |
| 4,190,457 | 2/1980 | McDaniel | 423/338 X |
| 4,191,587 | 3/1980 | Kratel et al. | 428/405 X |
| 4,327,065 | 4/1982 | von Dardel et al. | 423/338 |
| 4,333,564 | 6/1982 | Hertl et al. | 252/315.2 X |
| 4,402,927 | 9/1983 | von Dardel et al. | 423/335 |
| 4,432,956 | 2/1984 | Zarzycki et al. | 423/338 |
| 4,619,908 | 10/1986 | Cheng et al. | 502/214 |
| 4,622,310 | 11/1986 | Iacobucci | 502/208 |
| 4,731,264 | 3/1988 | Lin et al. | 427/387 |
| 5,122,291 | 6/1992 | Wolff et al. | 252/62 |
| 5,207,814 | 5/1993 | Cogliati et al. | 501/12 X |
| 5,275,796 | 1/1994 | Tillotson et al. | 252/315.01 X |

FOREIGN PATENT DOCUMENTS

| | | |
|---|---|---|
| 4198238 | 7/1992 | Japan . |
| WO923378 | 3/1992 | WIPO . |

OTHER PUBLICATIONS

Aerogels: The World's Lightest Solids, Hrubesh, L.W.; Chemistry and Industry, 24 824; 1990.

Aerogels and Their Applications, Fricke, Jochen; Journal of Non–Crystalline Solids 147&148 (1992) 356–362, North–Holland.

Formation of Microporous Silica Gels from a Modified Silicon Alkoxide, Farenholtz, W.G.; Journal of Non–Crystalline Solids 144 (1992) 45–52.

Hydrophobic Aerogels from $Si(OMe)_4/MeSi(OMe)_3$ Mixtures, Schwertfeger, Fritz; Journal of Non–Crystalline Solids 145 (1992) 85–89, North–Holland.

Preparation of Low–Density Aerogels at Ambient Pressure, Smith, D.M.; Mat. Res. Soc. Symp. Proc. vol. 271, 567–572; 1992.

*Primary Examiner*—Richard D. Lovering
*Attorney, Agent, or Firm*—Womble Carlyle Sandridge & Rice PLLC

[57] ABSTRACT

Thermally insulative xerogels and their preparation are described. To obtain these xerogels, an inorganic gel having hydroxyl moieties is reacted with a silicon-nitrogen compound which has a $C_{1-6}$ hydrocarbon moiety on the silicon. Shrinkage of the gel during drying the gel is reduced and a more highly porous xerogel is obtained. The more highly porous xerogel has a low thermal conductivity which makes it a good thermal insulation.

17 Claims, No Drawings

XEROGELS AND THEIR PREPARATION

BACKGROUND OF THE INVENTION

FIELD OF THE INVENTION

This invention describes xerogels and a process for their preparation. These xerogels have a higher porosity, which gives these compositions characteristics more similar to aerogels.

It is well known that gels can be dried to obtain porous, low density materials. Compositions with such features are particularly attractive for insulation and as matrices for radioluminescent light sources. Applications could also be found in acoustics, catalysis, filtration, high energy physics, solar energy and conservation.

Xerogels are dried gels which are formed by drying the gel at atmospheric pressure, typically using elevated temperatures; shrinkage of the gel's solid network occurs in drying. Unfortunately, in fact, the resulting xerogel is often reduced in volume by a factor of 5 to 10 compared to the original wet gel. The undesired loss of volume has in fact been noted in The Concise Chemical and Technical Dictionary (Chemical Publishing Co. 1974) which teaches that the removal of volatile fluid from the gel during the xerogel preparation results in shrinkage to a harder and stronger mass. That shrinkage is disadvantageous for properties such as porosity, density and thermal conductivity, which are all important for insulation.

Low-density xerogels are discussed in D. M. Smith, Better Ceramics through Chemistry V, Mat. Res. Soc. Symp. Proc. Vol. 271, pages 567–572 (1992). According to this reference, aging and surface derivatization can be used to control the capillary pressure and gel matrix strength of base-catalyzed alkoxide derived silica gels and subsequent formation of xerogels under ambient pressure conditions. Generally, the removal of pore fluids during drying in a non-supercritical process causes the gel network to collapse due to the high capillary pressure and further chemical reactions between surface sites.

Aerogels are more highly porous and less dense but they are produced by drying the gel under supercritical conditions of pressure and temperature where a single phase exists (note U.S. Pat. No. 2,249,767). Other references which discuss aerogels and their preparation include: U.S. Pat. Nos. 2,978,298; 3,977,993; 4,402,927 and L. W. Hrubesh, Chemistry and Industry, 24 824, 1990. Supercritical processes, however, are costly, potentially dangerous, and more complex, which makes these processes impractical, particularly in large scale operations.

Aerogels produced by drying wet gels under the supercritical conditions which maintain a single phase (allowing no interface between liquid and vapor) also are, disadvantageously, very difficult to make, although their properties and characteristics are more desirable than xerogels. Under supercritical conditions there is minimal shrinkage and the aerogels have a low volume fraction of solid.

Xerogels are made at atmospheric pressure. It would, therefore, be advantageous to have lower density, more highly porous xerogels. Most desirably the porosity should approach the porosity of aerogels. A non-supercritical process for the production of such xerogels is needed.

As an object of the present invention xerogels are produced which have a lower density and a higher porosity.

A further object of the present invention provides a method of chemically treating a wet gel with silicon-nitrogen compounds to reduce the compressive forces and shrinkage when drying under non-supercritical conditions. The use of this chemical treatment greatly reduces the cost by eliminating the need to contain the gel under high pressures.

This invention also provides xerogels which are hydrophobic and therefore are not attacked by moisture.

The instant invention, furthermore, achieves this xerogel modification using non-hazardous reagents and by-products.

SUMMARY OF THE INVENTION

To prepare the xerogels of the present invention certain silicon-nitrogen compounds are reacted with the available hydroxyl sites in the network of an inorganic gel, giving it a hydrophobic surface and giving the product a higher porosity and lower bulk density. For the present invention the starting material needed is an inorganic wet gel having hydroxyl moieties in the gel's solid structure. The hydroxyl moieties must be present to react with the silicon-nitrogen compound.

In the process, the silicon-nitrogen compound contacts the gel, whereby the hydroxyl moieties of the gel's solid structure react with the silicon-nitrogen compound. Preferably, the compound is in a solution which contains an excess of the silicon-nitrogen compound for the available sites in the gel. After the reaction the liquid is removed from the gel by drying at atmospheric pressure. When the gel has dried, the solid structure (then called a xerogel) is left. The presence of the silicon-nitrogen moiety, which has been added to the solid matrix, allows the drying gel to resist the collapse which ordinarily occurs in drying. This results in a more highly porous xerogel product.

In using the instant silicon-nitrogen compounds, the dry xerogel produced, moreover, is free of corrosive and environmentally offensive impurities such as halogen and ammonia. The porosities of the silica xerogels obtained by the method described herein exceed 60% and in preferred xerogels they are 75% or more.

DETAILED DESCRIPTION

The starting material needed to prepare the xerogel's of the present invention is any inorganic gel which has hydroxyl moieties in the solid structure of the gel. A gel consists of a rigid network of polymeric chains (the solid structure or matrix) whose average length is greater than a micrometer interconnected with a fluid phase of submicrometer dimensions ("Sol-Gel Science", Academic Press, 1990, Chapter 1, page 8).

For reaction with the silicon-nitrogen compound the gel starting material will be wet with some fluid phase. The fluid phase can be a polar or non-polar hydrocarbon solvent. Alternatively the fluid can be miscible with or extracted by the silicon-nitrogen compound's solvent. The silicon-nitrogen compound can, under conditions such as these, readily contact and react with the hydroxyl moiety of the gel's solid structure. In other alternatives the fluid phase of any inorganic gel can be extracted and replaced by a hydrocarbon solvent before contacting the gel with the silicon-nitrogen compound. Such an extraction step is, in fact, preferred when an inorganic gel has a substantially aqueous fluid phase. It is not necessary to have the silicon-nitrogen compound in a solvent if the gel's fluid phase suitably enables or promotes the reaction with the hydroxyl moiety (such as by solvating, solubilizing, or otherwise introducing the molecule to the hydroxyl moiety so that the reaction occurs).

The preparation of the inorganic gel is known in the art. Any of these gel-preparation processes and their inorganic gel products which contain the hydroxyl moieties can be used for the instant invention. In fact the inorganic gel used as starting material with the process described herein can be a mixture of gels, obtained using more than one method. The starting gel which is to be used in the reaction with the silicon-nitrogen compounds should have at least about 1 mole percent of the hydroxyl moieties. Acceptably, the hydroxyl moieties can be present in the starting gel at an amount in the range of from about 1 to about 25 mole percent and preferably in the range of from about 5 to about 20 mole percent.

A preferred gel for use with the instant invention can be selected from the group consisting of alumina, titania, zirconia, vanadium oxide, and silica. A preferred silica gel material can be prepared by condensation of tetraalkoxysilane or co-condensation of a tetraalkoxysilane and lower functional alkoxysilane (G. L. Wilkes and R. H. Glaser, J. Non-Crystalline Solids 113 (1989) 73).

The silicon-nitrogen compound is reacted with the hydroxyl moiety (—OH) of the inorganic gel to prevent or at least deter the collapse of the gel's solid skeletal matrix. This silicon-nitrogen compound has at least one silicon-nitrogen bond with at least one hydrocarbon group attached to the central silicon atom. The reaction with the hydroxyl moiety of the inorganic gel puts —O—Si($C_{1-6}$)($R^2$)$_2$ moieties into the gel and results in a xerogel product which has the moieties and an increased porosity after drying ($R^2$ is defined under Formula 1).

Formula 1 shows the general formula of the silicon-nitrogen compounds.

Formula 1

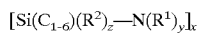

[Si($C_{1-6}$)($R^2$)$_z$—N($R^1$)$_y$]$_x$

In Formula 1, x can be any whole number from 1 to 20, z can be 1 or 2, and y can be 1, or 2. The silicon-nitrogen compound can be linear, branched, cyclic or contain cyclic moieties. For example, where y, z, or both y and z are 1 and x is 2 or more the silicon-nitrogen molecule can have: a cyclic structure (forming a molecular ring), a branched structure, or it could be either cyclic or branched and also contain cyclic moieties formed by the repeating units of —Si—N— (alternating —Si—N—Si—N—). In the silicon-nitrogen compound (of Formula 1) each $R^1$ independently can be a hydrogen, a $C_{1-6}$ hydrocarbon moiety having from 1 to 6 carbon atoms, or a Si($C_{1-6}$)$_3$ moiety. Similarly, each $R^2$ is independently either a $C_{1-6}$ moiety or an N($R^1$)$_{1\ or\ 2}$ moiety. Each $C_{1-6}$ is a hydrocarbon moiety which can independently be linear, branched or cyclic; saturated, unsaturated or aromatic, but it can only have hydrogen as a substituent. For example, with the most preferred embodiment, hexamethyldisilazane, in Formula 1 both y and z are 2 and the $C_{1-6}$ and each $R^2$ is a methyl group with one $R^1$ being a hydrogen and the other being the Si($C_1$)$_3$ moiety.

If desired, the gel can be contacted with a silicon-nitrogen compound which are preferred embodiments of Formula 1 and are selected from the compounds having the following formulas:

(1) $C_{1-6}(R^2)_2Si[—NR^1—SiC_{1-6}(R^2)—]v[—NR^1—SiC_{1-6}(R^2)_2]w$ where v and w, independently can be any whole numbers from 1–10, (2) $(C_{1-6})_3Si—NR^1—Si(C_{1-6})_3$, and (3) cyclo —[Si($C_{1-6}$)$_2$—NR$^1$]u— where u can be any whole number from 2 to 16; with each $C_{1-6}$, (as indicated above), independently being any cyclic, straight or branched, saturated, unsaturated, or aromatic hydrocarbon moiety having from one to six carbon atoms ($R^1$ and $R^2$ are defined above for Formula 1). One or more of any of these preferred compounds can contact the gel for reaction with the hydroxyl moieties.

In preferred silicon-nitrogen compounds of Formula 1 the $C_{1-6}$ moiety is a $C_1$ (methyl) group. More preferred compounds can be selected from the group consisting of: 1) disilazane materials of the type $(C_{1-6})_3SiNHSi(C_{1-6})_3$, and 2) polymers/co-polymers of the type —[Si($R^2$)$_2$NH]—[Si($R^2$)$_2$NR$^1$]— (where the $C_{1-6}$, $R^2$, and $R^1$ are independently the species indicated for Formula 1). More preferably, in this group, the silicon-nitrogen compounds have methyl moieties only. A highly preferred silicon-nitrogen compound for the reaction can be selected from the group consisting of hexamethyldisilazane and heptamethyldisilazane. Of these the most preferred is hexamethyldisilazane.

Commercially available reagents for this invention include: hexamethyldisilazane (having the formula HN[(SiMe$_3$)$_2$]$_2$, heptamethyldisilazane (having the formula MeN[(SiMe$_3$)$_2$]$_2$), and nonamethyltrisilazane (having the formula N[SiMe$_3$]$_3$) which can be obtained from Aldrich and hexamethylcyclotrisilazane (having the formula —[SiMe$_2$NH]$_3$—), octamethylcyclotetrasilazane (having the formula —[SiMe$_2$NH]$_4$—), 1,2-Dimethylsilazane, 1-methylsilazane (with the formula [HSiMeNMe]n—), and trimethylsilyazide (with the formula SiMe$_3$N$_3$) which can be obtained from Hüls America.

The reaction of these silicon-nitrogen compounds with the hydroxyl moiety of the gel places the —O—Si($C_{1-6}$)($R^2$)$_2$ moiety in the gel's structure. An amine is given off as a by-product. The gel starting material acceptably has the hydroxyl moiety present at an amount of at least about 1 mole percent. An acceptable range for the hydroxyl moiety is from about 1 mole percent to about 25 mole percent of the moiety in the gel. Preferably the hydroxyl moiety is present at an amount of at least about 5 mole percent, most preferably in the range of from about 5 to about 20 mole percent.

The xerogels described herein have a high porosity. The porosity, in fact, being improved by the instant process which uses the silicon-nitrogen compound. With the higher porosity, the instant xerogel is, therefore, an excellent thermal insulation. These insulative xerogel compositions can easily provide a thermal conductivity less than 0.031 W/m/K (watts per meter per degree kelvin) at ambient temperatures. Acceptably, the xerogel has at least about 0.5 mole percent or more of the —O—Si($C_{1-6}$)($R^2$)$_2$ moiety in its structure, suitably in the range of from about 0.5 to about 25 mole percent. Preferably, these moieties are present in at least about 2 mole percent. Preferably an amount in the range of from about 2 to about 18 mole percent. In more preferred xerogels there will be at least about 5 mole percent.

To prepare a xerogel of the present invention, a wet, inorganic gel having hydroxyl moieties is contacted with a silicon-nitrogen compound having the structural formula previously indicated. Preferably, a solution is prepared by mixing the silicon-nitrogen compound in a solvent. The gel is allowed to contact the compound in the solution for a sufficient amount of time for the reaction to occur between the hydroxyl moieties and the compound.

The hydrocarbon solvents for the silicon-nitrogen compound can be either polar or non-polar, including hexane, heptane, methanol, ethanol, isopropanol, toluene, and tetrahydrofuran. Preferably a solvent is selected from the group consisting of hexane, toluene, teterahydrofuran, methanol, and ethanol. The most preferred solvent is ethanol.

As the concentration of the silicon-nitrogen compound increases with respect to the number of hydroxyl moieties available in the structure of the wet gel, the less is the collapse of the gel's solid structure during drying, and the higher the porosity of the xerogel product. Acceptably, for the reaction, the amount of silicon-nitrogen compound relative to the number of hydroxyl moieties should (at a minimum) give at least about a 1:1 ratio. Preferably this ratio will be greater, the amount of silicon-nitrogen compound being used in excess to encourage as complete a reaction as possible. Preferably, for the reaction the concentration ratio of silicon-nitrogen compound to hydroxyl moieties is at least about 2.5:1 and most preferably it is at least about 10:1 or more.

In preferred processes, the gel will not contain water when it is contacted with the silicon-nitrogen compound. If water is present some of the compound will react with the water instead of the gel's hydroxyl moiety. In such a case, a higher concentration of the silicon-nitrogen compound is used. The concentration should be high enough to put the ratio of silicon-nitrogen compound to hydroxyl moiety at a minimum of about 1:1 with enough excess to allow for the water. In the presence of water, therefore, enough of the compound is provided to deplete the reaction with the water and also complete the reaction with the gel's hydroxyl moiety.

Gels which contain about 5% or less (by weight) of water can easily be used, and non-aqueous gels (containing less than 1% by weight water) are most preferred. If a gel has been prepared by a method which leaves water in the wet gel, then preferably, the water is removed by extracting it with a solvent liquid which is suitable for water extraction. If desired, water-adsorbing molecular seives can be used.

If desired, heat can be applied as the silicon-nitrogen compound reacts with the inorganic gel structure. Advantageously, heat can insure a complete reaction within a shorter time. The temperature is maintained at a level which is less than the boiling point of the solution containing the silicon-nitrogen compound. Suitably, while the silicon-nitrogen compound is permitted to contact the hydroxy moiety-containing gel, the temperature can be in the range of from ambient temperatures up to about 65° C.

After contacting the inorganic gel with the silicon-nitrogen compound for a sufficient length of time to complete the reaction with the gel's hydroxyl moieties the gel is dried. In preferred embodiments the gel can be washed with solvent to remove unreacted silicon-nitrogen compound, although this washing step is not needed to obtain the xerogel product.

Drying is done at atmospheric pressures. Ambient temperatures are suitable for the drying step, although it is preferred to use heat in order to speed drying. The drying xerogel product can be dried at temperatures up to about 140° C. A preferred process dries the wet gel product at temperatures in the range of from about 35 to about 100° C. before completing drying at ambient temperatures.

The bulk density of the xerogel product is less than about 0.7 grams per cubic centimeter (g/cm$^3$). Preferred xerogels are even lighter with densities of about 0.45 g/cm$^3$ or less. Using the processes described herein, xerogels can be obtained which have at least about 60% porosity or greater. Preferred xerogel products will have higher porosities of about 75% or more. The clarity of the xerogel is from translucent to transparent.

EXAMPLES

I. Gel Preparation

Unless otherwise indicated below, the gels which were used in the following examples were made according to this procedure.

In the amounts indicated, the tetraethoxysilane (TEOS—from Aldrich), hydrochloric acid and, for those examples using it, the methyltriethoxysilane (MTEOS—from Aldrich) gel-modifier were stirred together for 2 hours. The ethanol was then added and the resulting mixture was stirred until homogeneity was obtained. The ammonium hydroxide was then added, and after stirring briefly, the sample was stored at 50° C. until it gelled. Example 1, which did not have any MTEOS, had gelled after one day. With the MTEOS present, gelation took longer.

After the samples had gelled, the gel materials were washed with pure ethanol to remove residual water before beginning xerogel preparation. In each single ethanol wash the volume of ethanol used was two to four times that of the gel material. The gel samples were washed by agitating each sample in ethanol for one day and repeating this with fresh ethanol three more times followed by one washing in hexane for one day.

II. Xerogel Preparation

The xerogel's of Examples 1–4 were prepared according to the following description.

After the gel samples were made (according to the procedure indicated above), the gel sample was transferred into a hexane solution which was 20% by volume of the particular Si—N compound which was used for the reaction. The volume of this hexane solution which was used was from two to four times that of the silica gel. The particular Si—N compound used is noted below in each example. After combining the gel and the solution the combination was stored to allow enough time for a complete reaction (a minimum of one day).

After a sufficient amount of time was allowed for each reaction, the gel material was washed once with hexane for a period of one day to remove the residual silicon-nitrogen compound. To finish the process and obtain the xerogel product each sample was then dried.

The hexane was decanted off and the sample was first allowed to dry at ambient temperatures. After drying at room temperature the samples were dried for 24 hours at each of the following temperatures: 50° C. and finally 100° C. Atmospheric pressure was used for the entire drying period.

For Examples 1–10 the Si—N (silicon-nitrogen) compound was used in excess, providing a greater amount of this reactant than all of the reactive hydroxyl moieties on the gel structure. In Example 10 the amount of the silicon-nitrogen compound used for each of the samples was varied to demonstrate the effect which lower concentrations had on the xerogel product.

After drying, each xerogel sample was tested. The procedures used and the data obtained are given below.

III. Test Methods

A. The bulk densities of xerogels prepared under the examples which follow were determined by mercury porisimetry.

B. The skeletal densities were determined by using a helium picnometer.

C. Using the values obtained for skeletal and bulk density, the percent porosity was calculated by the equation:

$$\% \text{ Porosity} = \frac{\text{Skeletal Density} - \text{Bulk Density}}{\text{Skeletal Density}} \times 100$$

The data obtained on each sample for bulk and skeletal density and porosity is given both in each example and is shown in Table II for a fast, overall comparison.

D. The values for surface areas and pore size distribution was determined by nitrogen adsorption using a Micromeritics ASAP2000 instrument. Values for surface area and average pore diameter were obtained only for Examples 2 and 4. The results are also compared in Table III.

Example 1

For this example the gel was prepared using an approximate silicone:ethanol:water:acid mole ratio of 1:3:4:0.0018. The specific amounts (in grams) are:

| TEOS | 13 |
| HCl (.0252 N) | 4.4 |
| Ethanol | 8.7 |
| NH$_4$OH (.1 N) | 2.0 |

Hexamethyldisilazane (HMDS—from Aldrich) was used as the Si—N compound. The xerogel was prepared according to the procedure indicated above. After drying the following values were obtained for bulk density, skeletal density and porosity:

| bulk density | .44 g/cm$^3$ |
| skeletal density | 1.519 g/cm$^3$ |
| percent porosity | 71% |

Example 2

The approximate mole ratio for silicone:ethanol:water:acid 1:3:4:0.0018 was used. The specific amounts of the ingredients (in grams) are:

| MTEOS | 1.1 |
| TEOS | 11.7 |
| HCl (.0252 N) | 4.4 |
| Ethanol | 8.7 |
| NH$_4$OH (.1 N) | 2.0 |

The HMDS was again used as the Si—N compound. The gel remained in the solution with this agent for a period of four days. The xerogel was prepared according to the procedure indicated above.

After drying the following values were obtained for bulk density, skeletal density and porosity:

| bulk density | .36 g/cm$^3$ |
| skeletal density | 1.483 g/cm$^3$ |
| porosity | 75% |

The BET surface area of this sample was 873 m$^2$/g and the average pore diameter was found to be 7.9 nanometers (nm) using the BJH nitrogen adsorption test.

Spectroscopic evidence that the HMDS did react with the pore silanol surface is provided by solid state C-13 NMR. The NMR spectrum of this material shows a prominent resonance at 0 ppm due to the methyl groups on the (CH$_3$)$_3$—Si— group attached to the pore wall. This confirms the attachment of this group to the oxygen of the gel's hydroxyl group forming the (CH$_3$)$_3$—Si—O— moiety in the product.

In the solid state C-13 NMR spectrum the xerogel had four prominent resonances (relative to tetra methyl silane):

A) at 60 ppm, —Si—O—$\underline{C}$H$_2$—CH$_3$
B) at 18 ppm, —$\underline{C}$H$_3$—CH$_2$—O—Si
C) at 0 ppm ($\underline{C}$H$_3$)$_3$Si—O—
D) at −5 ppm $\underline{C}$H$_3$—Si—(OR)$_3$ (from MTOS)

The presence of these peaks shows that the moiety indicated in A)–D) was present in the xerogel sample, and also shows that the reaction of the silicon-nitrogen compound did occur. The carbon having resonance in the NMR is underlined above.

Example 3

The mole ratio for silicone:ethanol:water:acid was approximately 1:3:3.6:.0009. The specific amounts of the ingredients (in grams) are:

| MTEOS | 2.2 |
| TEOS | 10.4 |
| HCl (.0126 N) | 4.0 |
| Ethanol | 8.7 |
| NH$_4$OH (.1 N) | 2.0 |

The HMDS was again used as the Si—N compound. The xerogel was prepared according to the procedure indicated above. After drying the following values were obtained for bulk density, skeletal density and porosity:

| bulk density | .26 g/cm$^3$ |
| skeletal density | 1.53 g/cm$^3$ |
| porosity | 82% |

Example 4

In this example the mole ratio for the silicone:ethanol:water:acid in the gel was approximately 1:3:4:0.0018. The specific amounts of the ingredients (in grams) are:

| MTEOS | 3.3 |
| TEOS | 9.1 |
| HCl (.0252 N) | 4.4 |
| Ethanol | 8.7 |
| NH$_4$OH (.1 N) | 2.0 |

The HMDS was again used as the Si—N compound. The gel remained in the solution with this agent for a period of four days. The xerogel was prepared according to the procedure indicated above. After drying the following values were obtained for bulk density, skeletal density and porosity:

| bulk density | 0.52 g/cm$^3$ |
| skeletal density | 1.433 g/cm$^3$ |
| porosity | 63% |

The BET surface area of this sample was 965 m$^2$/g and the average pore diameter was found to be 5.1 nm (nanometers) using the BJH nitrogen adsorption test.

Example 5

Silica gel material was prepared identically to the gel used for Example 6. The Si—N compound which was reacted with this gel's structure was the disilazane co-polymer —[SiMeH—HN]m[SiMeH—MeN]n (PS116 from Hüls) which was used as approximately 20% by volume solution of hexane. The gel remained in the solution with this agent for a period of four days. To obtain the xerogel the subsequent processing was done as is described in Example 1.

After drying the following values were obtained:

| | |
|---|---|
| bulk density | .62 g/cm$^3$ |
| skeletal density | 1.59 g/cm$^3$ |
| porosity | 61% |

The solid state C-13 NMR spectrum was obtained for this sample. The xerogel product had three prominent resonances (relative to tetra methyl silane):

A) at 58 ppm, —Si—O—$\underline{C}$H$_2$—CH$_3$

B) at 18 ppm, —$\underline{C}$H$_3$—CH$_2$—O—Si

C) at 0 to −5 ppm broad resonance due to the polymeric silicon-nitrogen compound which was used.

The presence of these peaks shows that the moiety indicated in A)–C) was present in the xerogel sample, and also shows that the reaction of the silicon-nitrogen compound did occur. The underlined carbon has the resonance in the NMR.

Example 6

A TEOS stock solution was prepared using a mole ratio of approximately 1:3:1:0.0007 for the TEOS:ethanol:water:HCl. This solution was refluxed for two hours. After the solution had cooled 100 ml of it was combined with 10 ml of 0.05N NH$_4$OH. Gellation of this material occurred overnight at 50° C.

After five washes in absolute ethanol (one day each) and a one day wash in hexane, the gel was put in a 20 percent volume of HMDS in hexane. The gel material was allowed to react for a period of four days. The gel was further washed with hexane to remove unreacted Si—N compound. After the hexane was decanted off the sample air dried at ambient temperatures for one day and then was heated at 50° C. for one day followed by 100° C. for one day. A non-collapsed xerogel material was obtained.

The following values were obtained for bulk density, skeletal density and porosity:

| | |
|---|---|
| bulk density | .36 g/cm$^3$ |
| skeletal density | 1.6 g/cm$^3$ |
| porosity | 77% |

Example 7

A silica gel having a TEOS:ethanol:water:HCl mole ratio of 1:3:1:0.0007 was prepared by adding TEOS (56.97 g), absolute ethanol (47.9 g), deionized water (4.9 g), and 0.2 ml of 1 M HCl to a 250 ml round neck flask. After refluxing the mixture for 1.5 hours it was cooled and a 10 ml alaquot was transferred to a cylindrical container and combined with 1 ml of a 0.05N solution of NH$_4$OH. The sample was capped and placed at 50° C. overnight. The resulting gelled material was washed in absolute ethanol for approximately 1.5 hours. This ethanol wash procedure was repeated five times.

The gel was then submerged in hexane for one hour and agitated periodically. The gel was then transferred to a hexane solution containing 20% by volume of HMDS (the volume of gel to hexane/HMDS was 1:10). After the material was allowed to stand for approximately one day at 50° C., the gel was transferred to pure hexane for one hour to remove unreacted material. The hexane was decanted off and the gel was dried at 37.4° C. for three hours followed by 99° C. for two hours. After drying the following values were obtained for bulk density, skeletal density and porosity:

| | |
|---|---|
| bulk density | .20 g/cm$^3$ |
| skeletal density | 1.70 g/cm$^3$ |
| porosity | 88.1% |

Example 8

A gel was prepared as is described in Example 7. After the gel was washed, first in the ethanol and then in the hexane, it was transferred to a hexane solution containing heptamethyldisilazane (HPMDS) in a 20% by volume solution; there was a volumetric ratio of gel:(hexane/HPMDS) of 1:20. After sitting for two days at room temperature, the gel was washed in hexane for one day and then dried at room temperature for one day, 50° C. for one day, and 100° C. for eight hours. After drying the following values were obtained for bulk density, skeletal density and porosity:

| | |
|---|---|
| bulk density | 55 g/cm$^3$ |
| skeletal density | 1.72 g/cm$^3$ |
| porosity | 68.2% |

The solid state C-13 NMR spectrum was obtained for this sample. The xerogel had three prominent resonances (relative to tetra methyl silane):

A) at 60 ppm, —Si—O—$\underline{C}$H$_2$—CH,

B) at 18 ppm, —$\underline{C}$H$_3$—CH$_2$—O—Si

C) at 0 ppm ($\underline{C}$H$_3$)$_3$Si—O—

The presence of these peaks shows that the moiety indicated in A)–C) was present in the xerogel sample, and also shows that the reaction of the silicon-nitrogen compound did occur. The carbon having resonance in the NMR is underlined above.

Example 9

A gel was prepared using the procedure identical to Example 7 and a 250 ml aliquot was combined with 25 ml. of 0.1M NH$_4$OH. After the sample gelled (at 50° C.), four ethanol washes (of 1 hour each) were completed.

In a procedure which avoided the use of hexane, one half of the gel obtained was put in a solution of 70 ml of HMDS and 280 ml of absolute ethanol and allowed to stand for two days. After this reaction period the gel was washed once in ethanol for one hour and dried at 50° C. for one day followed by 100° C. for approximately 3 hours, producing the dried xerogel.

After drying the following values were obtained for bulk density, skeletal density and porosity:

| | |
|---|---|
| bulk density | .213 g/cm$^3$ |
| skeletal density | 1.515 g/cm$^3$ |
| porosity | 82% |

This sample was also subjected to solid state C-13 NMR which confirmed the reaction of the silicon-nitrogen compound with the hydroxyl group. The NMR spectrum had a prominent resonance at 0 ppm due to the methyl groups of the $(CH_3)_3Si$— group attached to the pore wall. This confirms the reaction which attached the group to the oxygen of the gel's hydroxyl moiety.

The solid state C-13 NMR spectrum was also obtained for the sample. The xerogel product had three prominent resonances (relative to tetra methyl silane):

A) 60 ppm Si—O—$\underline{C}H_2$—$CH_3$

B) 18 ppm $\underline{C}H_3$—$CH_2$—O—Si

C) 0 ppm $(\underline{C}H_3)_3Si$—O—

The presence of these peaks shows that the moiety indicated in A)–C) was present in the xerogel sample. The carbon having resonance in the NMR is underlined above.

Based on silicon solid state NMR data, greater than 90% of the -hydroxyl moieties in the gel of this example had reacted. Using this data as a basis for estimate, therefore, it is reasonable to conclude that with a process having a gel with at least about 1 mole percent of hydroxyl moieties, this invention can easily obtain a xerogel having at least about 0.5 mole percent of the —O—$Si(C_{1-6})(R^2)_2$ moiety in the dried xerogel.

The thermal conductivity of granules of this xerogel was measured using a guarded hot-plate instrument. The size of the granules was about 5 millimeters (mm) in diameter.

TABLE I

| Temperature (° C.) | Thermal Conductivity (W/m/K) |
| --- | --- |
| 30 | .0243 |
| 92 | .0293 |

Comparative Example

A gel was prepared as is described in Example 2, and the xerogel was prepared as is described for Example 2, except that the gel was not reacted with any silicon-nitrogen compound.

After drying the following values were obtained for bulk density, skeletal density and porosity:

| bulk density | .77 g/cm³ |
| --- | --- |
| skeletal density | 1.82 g/cm³ |
| porosity | 57% |

TABLE II

The values obtained in testing the products of the foregoing examples are shown below for comparison.

| Ex. No. | Surface Modifier | Bulk Density | Skeletal Density | Porosity (%) |
| --- | --- | --- | --- | --- |
| 1 | HMDS | 0.44 | 1.519 | 71 |
| 2 | HMDS | 0.36 | 1.483 | 75 |
| 3 | HMDS | 0.26 | 1.53 | 82 |
| 4 | HMDS | 0.52 | 1.433 | 63 |
| 5 | PS116 | 0.62 | 1.59 | 61 |
| 6 | HMDS | 0.36 | 1.60 | 77 |
| 7 | HMDS | 0.20 | 1.70 | 88.1 |
| 8 | HPMDS | 0.55 | 1.72 | 68.2 |
| 9 | HMDS | 0.213 | 1.515 | 82 |
| Comp.Ex. | none | 0.77 | 1.82 | 57 |

The gel network is known to collapse during the removal of fluids from the gels under non-supercritical drying. This results in a lower porosity and a higher bulk density.

From these examples, however, it is noted that the xerogel's of the instant invention have a higher porosity and lower bulk density.

TABLE III

BET Surface Area and Average Pore Diameter

| Ex. No. | Surface Modifier | BET Surface Area m²/g | Average Pore Diameter*nm |
| --- | --- | --- | --- |
| 2 | HMDS | 873 | 7.9 |
| 4 | HMDS | 965 | 5.1 |

*BJH Nitrogen Adsorption Average Pore Diameter

Example 10

A series of samples were prepared, each sample having a different concentration of the silicon-nitrogen compound. Table IV below shows the advantage of using these compounds in excess. When the compound was present in greater excess the higher porosities were obtained.

To prepare the gels for Samples A through F the following procedure was used. A silica gel having a TEOS:ethanol:water:HCl mole ratio of 1:3:1:0.0007 was prepared by adding TEOS (56.97 g), absolute ethanol (47.9 g), deionized water (4.9 g), and .2 ml of 1 M HCl to a 250 ml round neck flask. After refluxing the mixture for 1.5 hours it was cooled and a 10 ml aliquot was transferred to a cylindrical container and combined with 1 ml of a 0.05N solution of $NH_4OH$. The sample was capped and placed at 50° C. overnight. The resulting gelled material was washed in absolute ethanol for one day at a ratio of 1 part gel to 10 parts ethanol. This ethanol wash procedure was repeated five times.

The gel was then submerged in hexane for one day. After washing, each gel sample was put in a solution of HMDS in hexane. The excess concentration of the HDMS which each solution contained is indicated in the table below.

Each sample was permitted to contact the HMDS solution for two days at 50° C.

After the reaction the sample was washed in hexane to remove unreacted HMDS and the sample was then dried at 37.4° C. for three hours and then at 50° C. for one day followed by 100° C. for one day. The bulk density and porosity of each xerogel sample is given in Table IV.

TABLE IV

The following values were obtained for the porosity and bulk density of Samples A–F. The values obtained for the previously shown Comparison Example are repeated for a more easy observation.

| Sample | g. HMDS/ g. gel | Ratio of HMDS: —OH | Bulk Density | Porosity (%) |
| --- | --- | --- | --- | --- |
| A | .1 | 70 | .23 | 86.3 |
| B | .08 | 56 | .25 | 85.1 |
| C | .04 | 28 | .29 | 82.5 |
| D | .02 | 14 | .31 | 81.5 |
| E | .01 | 7 | .36 | 78.5 |
| F | .005 | 3.5 | .397 | 76.1 |
| Comp.Ex. | none | 0 | .77 | 57 |

The data of Table IV shows that higher porosities are obtained as the concentration of the silicon-nitrogen compound increases relative to the number of hydroxy sites in the gel.

What is claimed is:

1. A process for the preparation of a xerogel comprising contacting an inorganic wet gel having a polar or non-polar hydrocarbon solvent and less than 5% by weight of water, said gel having a solid gel structure that contains at least about 1 mole percent of hydroxyl moieties with a silicon-nitrogen compound which is present at an amount giving a concentration ratio of the silicon-nitrogen compound to the hydroxyl moieties of at least about 1:1, whereby the silicon-nitrogen compound reacts with the hydroxyl moieties in the gel to obtain a reaction product, further providing that the silicon-nitrogen compound had a formula of $(Si(C_{1-6})(R^2)_z-N(R^1)_y)_x$ wherein each $R^1$ can independently be a hydrogen, a $C_{1-6}$ moiety, or a $Si(C_{1-6})_3$ moiety and each $R^2$ can independently be a $C_{1-6}$ moiety or an $N(R^1)_2$ moiety, and wherein each $C_{1-6}$ moiety in the formula and in $R^1$ and $R^2$ has from 1 to 6 carbon atoms and can be a linear, branched or cyclic, saturated, unsaturated or aromatic hydrocarbon moiety in which each $C_{1-6}$ only has hydrogen as a substituent, and, in the formula, x can be any whole number from 1 to 20, z can be 1 or 2, and y can be 1 or 2 and further the said silicon-nitrogen compound can have a molecular structure which is linear, branched, cyclic or contains cyclic sections, and drying the reaction product at atmospheric pressure to obtain the xerogel.

2. The process of claim 1 wherein the gel contains less than 1% by weight water.

3. The process of claim 1 wherein the concentration ratio of the silicon-nitrogen compound to hydroxyl moieties of the gel is about 2.5:1 or greater.

4. The process of claim 1 wherein the hydroxyl moiety is present in the gel structure at an amount greater than about 5 mole percent.

5. The process of claim 1 wherein the gel is selected from the group consisting of alumina, titania, zirconia, vanadium oxide, and silica gel.

6. The process of claim 5 wherein the gel is silica.

7. The process of claim 1 wherein the silicon-nitrogen compound is in a solution which is a hydrocarbon solvent.

8. The process of claim 1 wherein the silicon-nitrogen compound is selected from the group consisting of hexamethyldisilazane and heptamethyldisilazane.

9. A xerogel which comprises a dried inorganic gel which was dried at atmospheric pressure and which has a bulk density less than about 0.7 g/cm$^3$ and a porosity greater than about 60%, wherein the gel is a dried reaction product between an inorganic wet gel having a polar or non-polar hydrocarbon solvent and less than 5% by weight of water, said gel having a solid structure containing hydroxyl moieties and a silicon-nitrogen compound, which had a formula of $(Si(C_{1-6})(R^2)_z-N(R^1)_y)_x$ wherein each $R^1$ can independently be a hydrogen, a $C_{1-6}$ moiety, or a $Si(C_{1-6})_3$ moiety and each $R^2$ can independently be a $C_{1-6}$ moiety or an $N(R^1)_2$ moiety, and wherein each $C_{1-6}$ moiety in the formula and in $R^1$ and $R^2$ has from 1 to 6 carbon atoms and can be a linear, branched or cyclic, saturated, unsaturated or aromatic hydrocarbon moiety having only hydrogen as a substituent, and further where, in the formula, x can be any whole number from 1 to 20, z can be 1 or 2, and y can be 2, where the said silicon-nitrogen compound can be linear, branched, cyclic or contain cyclic sections, and further wherein the xerogel contains moieties of $—O—Si(C_{1-6})(R^2)_2$ at an amount of at least about 0.5 mole percent.

10. The xerogel of claim 9 wherein the dried inorganic gel is selected from the group consisting of alumina, titania, zirconia, vanadium oxide, and silica gel.

11. The xerogel of claim 9 which contains $—O—Si(C_{1-6})_3$ moieties at an amount of at least about 2 mole percent.

12. The xerogel of claim 9 which contains a silica gel structure.

13. The xerogel of claim 9 where, in the moieties of $—O—Si(C_{1-6})(R^2)_2$ each $R^2$ is a methyl group and the $(C_{1-6})$ is a methyl group.

14. Thermal insulation which comprises a xerogel having a thermal conductivity less than 0.031 watts per meter per degree kelvin at ambient temperatures, a bulk density less than about 0.45 g/cm$^3$ and a porosity greater than about 60%, the xerogel further having moieties of $—O—Si(C_{1-6})(R^2)_2$ where each $R^2$ can independently be a $C_{1-6}$ moiety or an $N(R^1)_2$ moiety in which each $R^1$ can independently be a hydrogen, a $C_{1-6}$ moiety, or a $Si(C_{1-6})_3$ moiety, further providing that each of the $C_{1-6}$ moieties can have from 1 to 6 carbon atoms and can be a linear, branched or cyclic, saturated, unsaturated or aromatic hydrocarbon moiety having only hydrogen as a substituent, the said xerogel having the $—O—Si(C_{1-6})(R^2)_2$ moieties present at an amount of at least about 0.5 mole percent further providing that the xerogel is a reaction product between an inorganic wet gel having a solid structure containing hydroxyl moieties, the said wet gel having 5% or less by weight of water and being wet with a fluid phase which includes a polar or non-polar hydrocarbon solvent, and a silicon-nitrogen compound which had the formulation of $(Si(C_{1-6})(R^2)_z-N(R^1)_y)_x$ where x can be any whole number from 1 to 20, z can be 1 or 2, and y can be 1 or 2, where the said silicon-nitrogen compound can be linear, branched, cyclic or contain cyclic sections.

15. The thermal insulation of claim 14 wherein the xerogel has a dried inorganic gel structure wherein the inorganic gel is selected from the group consisting of alumina, titania, zirconia, vanadium oxide, and silica gel.

16. The thermal insulation of claim 14 where, in the moieties of $—O—Si(C_{1-6})(R^2)_2$, each $R^2$ is a methyl group and the $(C_{1-6})$ is a methyl group.

17. The thermal insulation of claim 16 wherein the xerogel has a dried silica gel structure, and the $O—Si(C_{1-6})(R^2)_2$ moieties are present at an amount of at least about 2 mole percent.

* * * * *